UNITED STATES PATENT OFFICE.

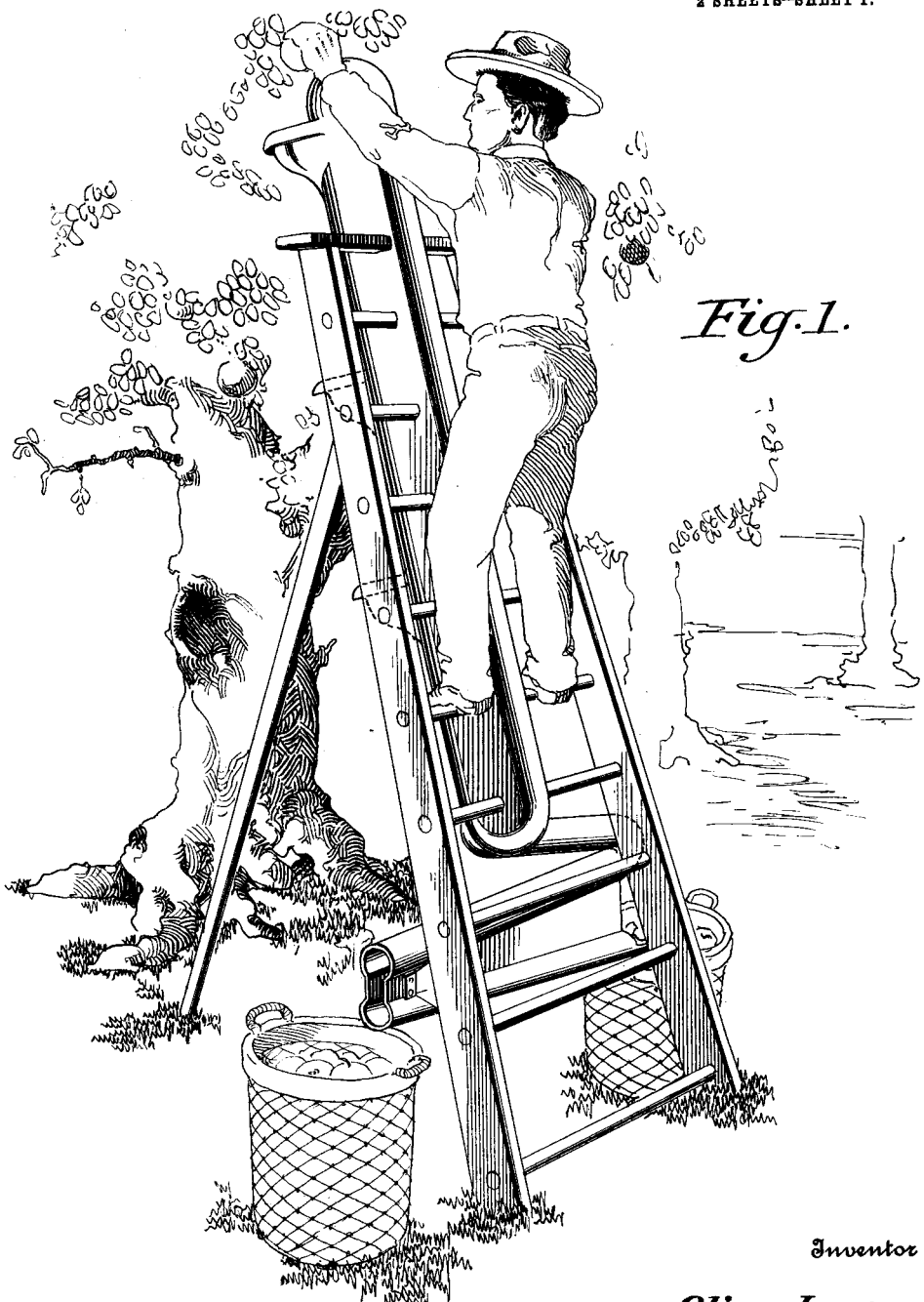

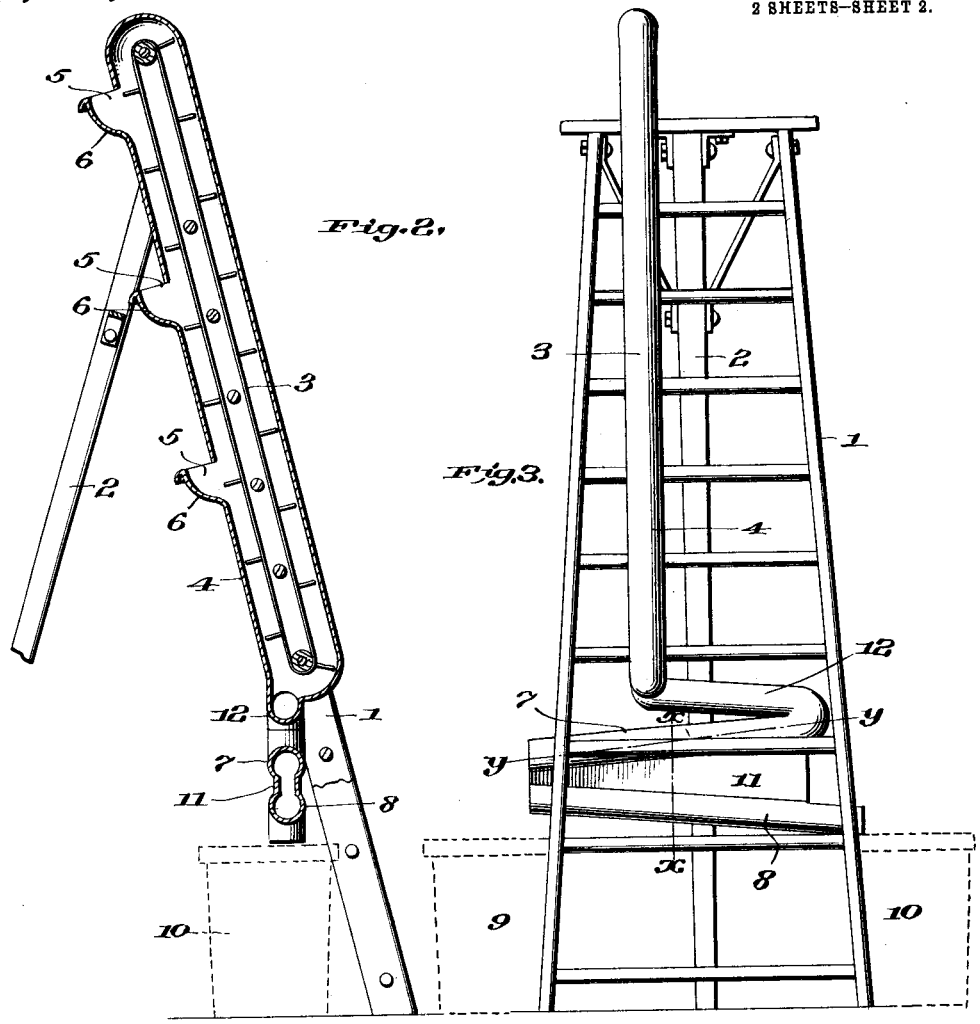

OLIVER LANCE, OF RODEO, CALIFORNIA.

FRUIT-PICKER'S LADDER.

1,102,059.　　　　　Specification of Letters Patent.　　Patented June 30, 1914.

Application filed June 13, 1913. Serial No. 773,518.

*To all whom it may concern:*

Be it known that I, OLIVER LANCE, a citizen of the United States, residing at Rodeo, in the county of Contra Costa and State of California, have invented new and useful Improvements in Fruit-Pickers' Ladders, of which the following is a specification.

The present invention has relation to ladders used by fruit gatherers and embodying a chute or like means for directing the fruit into a receptacle conveniently placed upon the ground for receiving the fruit as the same is picked.

The present invention aims to combine with a ladder means for receiving the fruit at different intervals and directing such fruit into an assorter by means of which the choice fruit is delivered into one receptacle and the inferior or small fruit is delivered into another receptacle, the assorting being automatically effected.

The invention further contemplates an endless conveyer and a tube therefor, such conveyer extending from the top of the ladder to the bottom thereof and being automatically operated by the weight of the fruit, the tube receiving an endless conveyer and having guarded inlets at different points in its length to facilitate the delivery of the fruit as picked to the conveyer by means of which it is directed to the predetermined point of discharge.

A further purpose of the invention is the provision of an assorting device which is arranged to receive the fruit from the conveyer and direct the same into different receptacles according to the size of the fruit, the latter being automatically separated.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a perspective view showing the application of the invention. Fig. 2 is a side view of the ladder and attachment, the parts being in section. Fig. 3 is a front view. Fig. 4 is a transverse section on the line *x—x* of Fig. 3. Fig. 5 is a horizontal section on the line *y—y* of Fig. 3.

Corresponding and like parts are referred to in the following description, and indicated in all the views of the drawings, by the same reference characters.

The numeral 1 designates the ladder which may be of any variety and which for convenience is shown provided with a leg or prop 2 whereby the ladder is rendered self-supporting after the manner of the usual step-ladder. An endless conveyer 3 is mounted upon the ladder 1 and passes around upper and lower guide pulleys. The endless conveyer may be of any construction and usually consists of a belt provided with flights or cleats which are adapted to receive the fruit. The endless conveyer is arranged with the steps or runs of the ladder between the parts or runs thereof as indicated most clearly in Fig. 2. The endless conveyer is arranged to operate with its outer portion moving upwardly and its inner portion traveling downwardly. A tube 4 incloses the endless conveyer and forms a casing or housing therefor. The rear portion of the tube or casing 4 is provided at intervals in its length with openings 5 for reception of the fruit such openings being protected by means of cups or guards 6 which are adapted to receive the fruit and direct the same through the openings 5 into the tube. The tube 4 may be of sheet metal or other desired material.

An assorting device is located near the foot of the ladder and comprises an upper member 7 and a lower member 8, such members being oppositely inclined and arranged to discharge the fruit into receptacles 9 and 10. The two members 7 and 8 are connected throughout their length by means of a part 11 which is hollow and has its longitudinal walls spaced so that the smallest fruit will pass from the member 7 into the member 8 of the assorter and discharge into the receptacle 10. The larger fruit will pass through the member 7 and discharge at the left-hand end into the receptacle 9. The tube 4 is provided at its lower end with a lateral extension 12 which communicates with the right-hand or receiving end of the member 7 thereby causing all the fruit to be discharged into the upper right-hand end of the assorter. The fruit in its travel through the member 7 of the assorter is separated, the smaller fruit dropping through the passage 11 into the member 8 and passing therein to the right and dropping into the receptacle 10. The larger or choice fruit passes through the member 7 and discharges from the left-hand end thereof into the receptacle 9.

By having the tube 4 provided at intervals in its length with receiving openings 5, the picker may conveniently deliver the fruit to the conveyer as picked, the fruit being received upon the flights or cleats of the conveyer and automatically operating the same. When the fruit reaches the lower end of the tube 4 it passes laterally through the discharge 12 and is delivered into the assorter which separates the fruit automatically so as to deliver the large fruit into the receptacle 9 and the smaller fruit into the receptacle 10, such operation being wholly automatic.

From the foregoing description, taken in connection with the accompanying drawings, the advantages of the construction and of the method of operation will be readily apparent to those skilled in the art to which the invention appertains, and while I have described the principle of the operation of the invention, together with the device which I now consider to be the best embodiment thereof, I desire to have it understood that the device shown is merely illustrative, and that such changes may be made when desired as are within the scope of the claim appended hereto.

I claim:—

An assorting device for the purposes specified comprising oppositely inclined tubes arranged one above the other and having their opposing sides longitudinally slotted, and parallel walls connecting such tubes and arranged in the plane of the respective edges bordering upon the slot thereof.

In testimony whereof I affix my signature in presence of two witnesses.

OLIVER LANCE.

Witnesses:
 JOHN SZARKOE,
 K. E. EDWARDS.

---

Copies of this patent may be obtained for five cents each, by addressing the "Commissioner of Patents, Washington, D. C."